(12) United States Patent
Seppänen et al.

(10) Patent No.: US 6,582,795 B1
(45) Date of Patent: Jun. 24, 2003

(54) POLYMER COMPOSITIONS

(75) Inventors: Hanneli Seppänen, Helsinki (FI); Hans Georg Daviknes, Stathelle (NO)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/701,296

(22) PCT Filed: Jun. 4, 1999

(86) PCT No.: PCT/FI99/00488

§ 371 (c)(1),
(2), (4) Date: Dec. 12, 2000

(87) PCT Pub. No.: WO99/64509

PCT Pub. Date: Dec. 16, 1999

(30) Foreign Application Priority Data

Jun. 5, 1998 (FI) .................................. 981298

(51) Int. Cl.⁷ ............................. B32B 27/32; B32B 5/12
(52) U.S. Cl. .................... 428/105; 428/516; 428/520; 428/522; 428/910; 156/177; 156/334
(58) Field of Search ................. 428/105, 910, 428/516, 515, 520, 522; 156/177, 334

(56) References Cited

U.S. PATENT DOCUMENTS

| | | | | |
|---|---|---|---|---|
| 4,874,653 A | * | 10/1989 | Rasmussen | ................. 428/105 |
| 4,877,663 A | | 10/1989 | Kambe et al. | ............. 428/35.5 |
| 5,032,442 A | * | 7/1991 | Yamazaki et al. | ........... 264/146 |
| 5,698,333 A | * | 12/1997 | Benoit et al. | ................ 283/107 |
| 5,716,695 A | * | 2/1998 | Benoit et al. | ................... 359/1 |
| 5,861,202 A | * | 1/1999 | Kimura et al. | .............. 156/177 |
| 6,106,924 A | * | 8/2000 | Yamazaki | ................... 428/105 |
| 6,127,293 A | * | 10/2000 | Kimura et al. | .............. 156/177 |

FOREIGN PATENT DOCUMENTS

GB      1084550      9/1967

* cited by examiner

*Primary Examiner*—D Lawrence Tarazano
(74) *Attorney, Agent, or Firm*—Birch, Stewart, Kolasch & Birch, LLP

(57) ABSTRACT

The present invention concerns a polymer composition and films manufactured from such compositions. The present polymer compositions comprise 80–99 wt-% on an essentially linear polyethylene with a component having a relatively low MW and a relatively high density, and another component having a relatively high MW and a relatively low density, said linear polyethylene having an $MFR_{21}$ of at least 5 g/10 min, a maximum $MFR_2$ of 6 g/10 min, a density of 915–945 kg/m³. Further the compositions contain 1–20 wt-% of a branched copolymer of ethylene and an acrylate monomer with 20–28 wt-% acrylate monomer units. The $MFR_2$ of the copolymer is 0.4 to 2.0 g/10 min. Cross-laminated film materials having good mechanical properties can be manufactured from the present compositions.

17 Claims, No Drawings

US 6,582,795 B1

POLYMER COMPOSITIONS

This application is the national phase under 35 U.S.C. §371 of PCT International Application No. PCT/FI99/00488 which has an International filing date of Jun. 4, 1999, which designated the United States of America.

BACKGROUND OF THE INVENTION

1. Field of the Invention

The present invention relates to polymer compositions, such as polymer compositions obtainable by blending of two polyethylene components, and to polymer films blown from such polyethylenes and the use thereof for manufacturing films. In particular, the present invention concerns cross-laminated film materials and a method for the production of such materials.

2. Description of Related Art

There is a growing demand for tough films made without any reinforcements due to both environmental aspects and cost reductions.

Cross-laminated films are basically produced by the following two principles:
(1) Two or several single mono- and coextruded blended films are MD-oriented, annealed, precut at 45–60° angles and extrusion laminated together. The final films have a smooth surface without any physical structures.
(2) Two of several single, mono- and coextruded blended films, are precut at 45°–60° angles and laminated together by annealing, biaxially stretching and orientation. The final films have a longitudinal physical rib-structure.

Other related films, and processes are: (3) various reinforced films by PA and PET nets between two PE (LDPE) films, extrusion laminated together by LDPE. (4) Stretched tape from PP and HDPE extrusion laminated by LDPE or PP.

The two first mentioned alternatives are discussed in a number of patent applications and patents. Thus, cross-lamination of films is known from, e.g., GB 1 316 640, GB 1 084 550, U.S. Pat. Nos. 4,475,971, 4,439,260, 4,885,196, WO 89/12533 and WO 93/14928.

GB 1 316 640 presents a process for cross-lamination of two oriented polymer films together through a bonding film in such a manner that the directions of orientation cross each other. The publication discloses the use of high density polyethylene and polypropylene films in the process.

GB 1 084 550 discusses a packing material which is obtained by cross-lamination of at least two uniaxially oriented films of polyethylene or polypropylene in such a manner that the directions of orientation cross each other. The material is perforated so that free passage of air and vapours is allowed.

U.S. Pat. No. 4,475,971 discloses a method of forming a cross-laminated film. The film is a coextruded composite film containing a lower melting thermoplastic and a higher melting thermoplastic. The composite film is then fed through a pair of rollers to provide a bias oriented film and then laminating two such films together so that their directions of orientation are crossed. Both polyethylene and polypropylene are mentioned.

U.S. Pat. No. 4,439,260 discloses another method of forming cross-laminated films where the oriented film is slitted at a bias relative to the movement of the film. Two strips are then laminated together so that the directions of orientation are crossed. High density polyethylene and polypropylene are mentioned. Also a two-layer structure containing EVA, LDPE or another low-melting plastic as an outer layer is mentioned.

A three-layered composite film is disclosed in U.S. Pat. No. 4,885,196. The central layer consists of a foamed material, such as a foamed EVA copolymer. The structure has been obtained by cross-lamating two films together, where each films contains at least two layers, one of the outer layers being the foamed material which then forms a bonding layer between the films.

WO 89/12533 discloses a method of cutting the film and the cross-laminating two thus obtained strips to a cross-laminated film.

WO 93/14928 discloses a cross-laminate of at least two films. Each film is a three layer composite containing a surface layer acting as a release layer, another surface layer acting as a bonding layer and a main layer in the middle. In specific embodiments, the main layer contains 70% HDPE, 20% LLDPE and 10% PP. The release layer contains 70% LLDPE and 30% EPDM.

While the three-layer films presented in WO 93/14928 give good mechanical properties, they can only be produced in machines which allow for three-layer extrusion.

SUMMARY OF THE INVENTION

It is an object of the invention to eliminate the problems of the prior art and to provide a simple cross-laminated structure which still gives excellent properties to the cross-laminated film.

It is another object of the invention to provide a new polyethylene composition which can be useful for a number of everyday applications.

It is a third object of the invention to provide a method of manufacturing cross-laminated film materials.

It has now surprisingly been found that by using a composition containing a linear ethylene polymer together with a copolymer of ethylene and a (meth)acrylate monomer, good mechanical properties are obtained together with a good processability with a single-layer original structure. Films made from such compositions can be employed for cross-laminated film structures to provide tough products with good mechanical strength. The (meth) acrylate monomer will give the films adhesive properties when the films are warm, which removes or reduces the need for intermediate tie layers between the plies of a cross-laminate.

In particular, the cross-laminates are produced from preferred, novel compositions according to the invention, which comprise:
(I) 80–99 wt-% of an essentially linear polyethylene comprising
  (i) a component having a relatively low MW and a relatively high density, and
  (ii) a component having a relatively high MW and a relatively low density, said linear polyethylene having an $MFR_2$ of at least 5 g/10 min, a maximum $MFR_2$ of 6 g/10 min, a density of 915–945 kg/m$^3$, and
(II) 1–20 wt-% of a branched copolymer of ethylene and a (meth)acrylate monomer containing 20–28 wt-% (meth)acrylate monomer units, said copolymer having an $MFR_2$ of 0.4 to 2.0 g/10 min.

Following the blending, the films are subjected to helical/biaxial cutting at a 45°–α° angle to the machine direction and cross-lamination is achieved by superimposing two or several equal films/plies and binding them together by eating and pressing.

More specifically, the cross-laminate film materials comprise at least two oriented polymer film plies laminated together, each film being uniaxially oriented in a generally different direction with regard to each other, at least one of said polymer films comprising a polymer composition formed by (I) 80–99 wt-% of an essentially linear polyethylene, which comprises
 (i) a component having a relatively low MW and a relatively high density, and
 (ii) a component having a relatively high MW and a relatively low density,
 said linear polyethylene having an $MFR_{21}$ of at least 5 g/10 min, a maximum $MFR_2$ of 6 g/10 min., a density of 915–945 kg/m$^3$, and (II) 1–20 wt-% of a branched copolymer of ethylene and an acrylate monomer containing 20–28 Wt-% acrylate monomer units, said copolymer having an $MFR_2$ of 0.4 to 2.0 g/10 min.

The method of producing the cross-laminates is characterized by a method comprising the steps of providing a polymer composition consisting essentially of
 (I) 80–99 wt-% of an essentially linear polyethylene, which comprises
  (i) a component having a relatively low MW and a relatively high density, and
  (ii) a component having a relatively high MW and a relatively low density,
  said linear polyethylene having an $MFR_{21}$ of at least 5 g/10 min., a maximum $MFR_2$ of 6 g/10 min., a density of 915–945 kg/m$^3$, and
 (II) 1–20 wt-% of a branched copolymer of ethylene and an acrylate monomer containing 20–28 wt-% acrylate monomer units, said copolymer having an $MFR_2$ of 0.4 to 2.0 g/10 min processing the polymer composition into a film, subjecting the film to helical cutting to provide film bands having oblique orientation, superimposing the film bands so that their directions of orientation are crossing; and laminating the bands together to form a cross-laminated film structure.

By blending a limited amount of a copolymer of ethylene and a (meth)acrylate monomer, in particular an alkylated (meth)acrylate monomer into a linear polyethylene, such as a bimodal LLDPE, the right balance between final mechanical film strength and bonding through the orientation process can be obtained.

The composition provides a simple solution for manufacturing single layer composition, it can be used in a large variety of machines.

DETAILED DESCRIPTION OF THE INVENTION

Definitions

For the purpose of the present invention, "slurry reactor" designates any reactor, such as a continuous or simple batch stirred tank reactor or loop reactor, operating in slurry and in which the polymer forms in particulate form. According to a preferred embodiment the slurry reactor comprises a loop reactor.

By "gas phase reactor" is meant any mechanically mixed or fluid bed reactor. Preferably the gas phase reactor comprises a mechanically agitated fluid bed reactor with gas velocities of at least 0.2 m/sec.

By "Melt Flow Rate" or abbreviated "MFR" is meant the weight of a polymer extruded through a standard cylindrical die at standard temperature in a melt indexer carrying a standard piston and load. MFR is a measure of the melt viscosity of a polymer and hence also of its molar mass. The abbreviation "MFR" is generally provided with a numerical subindex indicating the load of the piston in the test. Thus, e.g., $MFR_2$ designates a 2.16 kg load and $MFR_{21}$, a load of 2.16 kg. MFR can be determined using, e.g., by one of the following tests: ISO 1133 C4, ASTM D 1238 and DIN 53735.

By "Flow Rate Ratio" or abbreviated FRR is meant a ratio between two MFR values measured from the same polymer using different loads. The abbreviation FRR is generally provided with a subindex indicating which loads have been used to determine the FRR. Thus $FRR_{21/5}$ has been obtained as a ratio of $MFR_{21}$ to $MFR_5$. The FRR is a measure of the broadness of the MWD. A high FRR corresponds to a broad MWD.

Polymer Composition

The present invention concerns a polymer composition which comprises the (mechanical) blend of at least two components (I) and (II), viz. a linear, preferably low-density polyethylene polymer and a branched copolymer of ethylene and a (meth)acrylate monomer. The essentially linear low density polyethylene has a bimodal molecular weight distribution. It comprises a relatively high molecular weight portion and a relatively low molecular weight proportion. To obtain the desired mechanical properties, the low molecular weight portion should have higher density than the high molecular weight portion. The copolymer contains, according to a preferred embodiment, alkylated methacrylate units, but it is also possible to use copolymers containing vinyl acetate units.

The polymer composition according to the present invention comprises an essentially homogeneous blend of the linear polyethylene and the branched copolymer.

A particularly preferred polymer composition of the present invention comprises (I) 80–99 wt-% of an essentially linear polyethylene with at least
 (i) one component having a relatively low MW and a relatively high density, and
 (ii) one component having a relatively high MW and a relatively low density, and (II) 1–20 wt-% of a branched copolymer of ethylene and a (meth)acrylate containing 20–28% by weight of (meth)acrylate.

The linear PE composition has an $MFR_{21}$ of at least 5 g/10 min and a maximum $MFR_2$ of 6 g/10 min, a density of 915–945 kg/m$^3$. Preferably, the linear PE is produced in a low pressure process.

The copolymer of ethylene and a (meth)acrylate monomer has an $MFR_2$ of 0.4 to 2.0 g/10 min and it is produced in a high pressure process.

The linear low density polyethylene contains 30–90%, preferably 40–80% and in particular 50–65% high molecular weight polymer and 10–70%, preferably 20–60% and in particular about 35–50% low molecular weight polymer, calculated per weight of composition.

The $MFR_2$ of the low molecular weight component, if produced in the first stage of the polymerization process, should be at least 50 g/10 min. Otherwise, a sufficiently broad molecular weight distribution is not reached and the processability and the mechanical properties may suffer.

The branched copolymer of ethylene and an alkylated acrylate monomer may be for instance a copolymer of ethylene and methyl (meth)acrylate. Typically, the copolymer may have 20 to 28%, preferably 23–27% by weight, methyl (meth)acrylate units and it has an $MFR_2$ of preferably 0.7 to 1.5 g/10 min.

Preferably, the ethylene copolymer is ethylene/methyl (meth)acrylate, ethylene/ethyl (meth)acrylate, ethylene/butyl acrylate, or ethylene/vinylacetate copolymer. The methylacrylate content of the ethylene/methyl (meth)acrylate copolymer can be 5 to 40 weight-%, preferably 16 to 25 weight-%. Ethylacrylate content of ethylene/ethyl acrylate polymer can be 10 to 30 weight-%. Butylacrylate content of ethylene butylacrylate copolymer can be 5 to 30 weight-%. Vinyl acetate content in an ethylene vinylacetate copolymer, used as an alternative embodiment of the branched copolymer component, is 10 to 30 weight-%.

Preferably, the polymer composition contains, calculated from the weight of the composition, 85 to 97%, in particular 90 to 95%, linear bimodal polyethylene and 3 to 15%, in particular 5 to 10% branched copolymer. If the fraction of component (II) is too low, the processability is lowered. If the fraction of component (II) is too high, the film is sticky.

Polymerization Process

To produce the particularly preferred, bimodal polyethylene component of the present polymer compositions, ethylene is polymerized in the presence of a suitable catalyst, preferably a Ziegler-Natta catalyst (cf. below) or a single-site catalyst, at an elevated temperature and pressure. Polymerization is carried out in a series of polymerization reactors selected from the group of slurry and gas phase reactors. A loop reactor is a particularly preferred embodiment of polymerization in slurry reactors. The relatively high molar mass portion and the relatively low molar mass portion of the product can be prepared in any order in the reactors.

In the following the reactor system will be described with particular reference to a system akin to the one disclosed in EP Patent Specification No. 0 517 868 and comprising one loop reactor (referred to as "the first reactor") and one gas phase reactor (referred to as "the second reactor"), in that order. However, it should be understood that the reactor system can comprise the reactors in any number and order.

In every polymerization step it is possible to use also comonomers selected from the group of $C_{3-8}$ olefins, preferably $C_{4-10}$ olefins, such as 1-butene, 1-pentene, 1-hexene, 4-methyl-1-pentene, 1-heptene, 1-octene, 1-nonene and 1-decene as well as mixtures thereof. The use of comonomers is particularly preferred for the preparation of the high molar mass portion. The amount of comonomers in the present materials is generally 2 to 10 wt-%, preferably about 4 to 9 wt-%. The low molecular weight component contains less than about 3 wt-% comonomer.

In addition to the actual polymerization reactors used for producing the bimodal ethylene homo- or copolymer, the polymerization reaction system can also include a number of additional reactors, such as prereactors. The prereactors include any reactor for pre-polymerizing the catalyst and for modifying the olefinic feed, if necessary. All reactors of the reactor system are preferably arranged in series (in a cascade).

The polymerization comprises the steps of
subjecting ethylene, optionally hydrogen and/or comonomers to a first polymerization reaction in a first reaction zone or reactor,
recovering the first polymerization product from the first reaction zone,
feeding the first polymerization product to a second reaction zone or reactor,
feeding additional ethylene and optionally hydrogen and/or comonomers to the second reaction zone,
subjecting the additional ethylene and optional hydrogen and/or comonomer to a second polymerization reaction in the presence of the first polymerization product to produce a second polymerization product, and
recovering the second polymerization product from the second reaction zone.

Thus, in the first step of the process, ethylene with the optional comonomer(s) together with the catalyst is fed into the first polymerization reactor. Along with these components hydrogen as a molar mass regulator is fed into the reactor in the amount required for achieving the desired molar mass of the polymer. Alternatively, the feed of the first reactor can consist of the reaction mixture from a previous reactor, if any, together with added fresh monomer, optional hydrogen and/or comonomer and cocatalyst. In the presence of the catalyst, ethylene and the optional comonomer will polymerize and form a product in particulate form, i.e. polymer particles, which are suspended in the fluid circulated in the reactor.

The polymerization medium typically comprises the monomer (i.e. ethylene) and/or a hydrocarbon, and the fluid is either liquid or gaseous. In the case of a slurry reactor, in particular a loop reactor, the fluid can be a liquid or a so called supercritical fluid where the temperature and pressure in the reactor are higher than the critical temperature and pressure of the fluid. The polymer is circulated continuously through the slurry reactor by means of an agitator, or in the case on a loop reactor, by means of a circulation pump.

The slurry polymerization is conducted in an inert hydrocarbon diluent. Preferably, a light hydrocarbon, such as propane, isobutane, n-butane or isopentane, is used as a diluent. In particular propane is used, since this allows for operation at supercritical conditions at a relatively low temperature.

The conditions of the slurry reactor are selected so that at least 20 wt-%, preferably at least 35 wt-%, of the whole production is polymerized in the slurry reactor(s). The temperature is in the range of 40 to 110° C., preferably in the range of 70 to 100° C. The reaction pressure is in the range of 25 to 100 bar, preferably 35 to 80 bar. In order to produce a polyethylene having a density in excess of 960 kg/m$^3$, the polymerization is preferably carried out at supercritical conditions at temperatures over 90° C.

In slurry polymerization more than one reactor can be used in series. In such a case the polymer suspension in an inert hydrocarbon produced in the slurry reactor is fed without separation of inert components and monomers periodically or continuously to the following slurry reactor, which acts at lower pressure than the previous slurry reactor.

The polymerization heat is removed by cooling the reactor by a cooling jacket. The residence time in the slurry reactor must be at least 10 minutes, preferably 20–100 min for obtaining a sufficient degree of polymerization.

As discussed above, if a low molar mass polyethylene is the desired product, hydrogen is fed into the reactor. Hydrogen can be added to the reactor at ratio of at least 50 mol $H_2$/kmol ethylene, preferably 100–400 mol $H_2$/kmol ethylene. Comonomer can be added so that the ratio of comonomer to ethylene is 100–600 mol/kmol, preferably 200–400 mol/kmol.

The pressure of the first polymerization product including the reaction medium is reduced after the first reaction zone in order to evaporate volatile components of the product, e.g. in a flash tank. As a result of the flashing, the product stream containing the polyethylene is freed from hydrogen and can be subjected to a second polymerization in the presence of additional ethylene to produce a high molar mass polymer.

The second reactor is preferably a gas phase reactor, wherein ethylene and preferably comonomers are polymerized in a gaseous reaction medium.

The gas phase reactor can be an ordinary fluidized bed reactor, although other types of gas phase reactors can be used. In a fluidized bed reactor, the bed consists of the formed and growing polymer particles as well as still active catalyst come along with the polymer fraction. The bed is kept in a fluidized state by introducing gaseous components, for instance monomer on such flowing rate which will make the particles act as a fluid. The fluidizing gas can contain also inert carrier gases, like nitrogen and propane and also hydrogen as a modifier. The fluidized gas phase reactor can be equipped with a mechanical mixer.

If the high molecular weight component is to be produced in the gas phase reactor, hydrogen is added into the reactor so that the ratio between hydrogen and ethylene is less than 100 mol/kmol, preferably less than 50 mol/kmol. Comonomer is fed in a sufficient amount so as to achieve a ratio between comonomer and ethylene of 200–700 mol/kmol, preferably 300–500 mol/kmol.

If the low molecular weight polymer is produced in the gas phase reactor hydrogen is added into the reaction so that the ratio of hydrogen to ethylene is between 500 and 3000 mol/kmol, preferably between 1000 and 1500 mol/kmol. Comonomer may be added so that its ratio to ethylene is lower than 100 mol/kmol.

The polymerization can also be carried out without a slurry reactor in two or more cascaded gas phase reactors. Either the high molecular weight component or the low molecular weight component is produced in the first reactor.

The gas phase reactor used can be operated in the temperature range of 50 to 115° C., preferably between 60 and 110° C. The reaction pressure is typically between 10 and 40 bar and the partial pressure of monomer between 1 and 20 bar.

The pressure of the second polymerization product including the gaseous reaction medium can then be released after the second reactor in order optionally to separate part of the gaseous and possible volatile components of the product, e.g. in a flash tank. The overhead stream or part of it is recirculated to the second reactor.

The production split between the relatively high molar mass polymerization reactor and the relatively low molar mass polymerization reactor is 30–90:70–10. Preferably, 20 to 60%, in particular 35 to 50%, of the polymer is produced at conditions to provide a polymer having a $MFR_2$ of 100 g/10 min or more and constituting the low molar mass portion of the polymer, and 40 to 80%, in particular 50 to 65%, of the polymer is produced at such conditions that $MFR_{21}$ of the final polymer is not lower than 5 g/10 min, and the $MFR_2$ of the final polymer is not higher than 6, and constituting the constituting the high molar mass portion of the polymer. The density of the compositions is between 915–945 $kg/m^3$.

The copolymer of ethylene and a methacrylate is produced in a free radical process operating at high temperature and high pressure. The polymerization can be carried out in a tubular reactor or in an autoclave. If produced in a tubular reactor, the component (II) will be less sticky and have a higher melting temperature than if it is produced in an autoclave reactor.

Catalyst

Any known Ziegler-Natta type catalyst can be used in the process for manufacturing the polyethylene component. The catalyst can be supported on an inert carrier or it can be non-supported. If a supported catalyst is used, it can be supported on any suitable carrier known in the art, in particular a metal oxide or a metal oxide mixture, such as silica, alumina, silica-alumina and silica-titania.

Preferred catalysts comprise titanium tetrachloride on silica or alumina, wherein the support optionally contains magnesium chloride and optionally has been pretreated with an organometal complex. Examples of suitable catalysts are disclosed in WO 95/35323.

Blending and Compounding

The composition can be a dry blend of pellets which is fed into a film extruder. It is, however, also possible to precompound the blend of polyethylene and the ethylene copolymer using conventional methods for making polymer blends, such as melt blending in a single- or twin-screw extruder or in a Banbury mixer. When this blend is "diluted with ethylene copolymers, it is desirable to use dry blending, but also melt blending can be employed. The polymer components are generally blended together and transformed to pellets in a compounding step where the polymer components are first mixed with additives, like antioxidants and process stabilisers, then melt homogenised in an extruder and finally pelletised.

The extruder used in the compounding can be of any type known in the art. It may be either a single screw extruder which contains only one screw or a twin screw extruder which contains two parallel screws, or a combination of these. Preferably a twin screw extruder is used.

The twin screw extruder may be of either corotating or counterrotating type. In a corotating twin screw extruder the screws rotate in the same direction while in a counterrotating twin screw extruder the screws rotate in the opposite directions.

The film processing can be carried out by methods known per se, e.g. using a film blowing line including a film extruder.

The present polymer compositions provide tough films having high mechanical strength and can be used, e.g., as films for building and construction applications.

Cross-Lamination

According to a preferred embodiment, the present polymer compositions are employed for manufacturing cross-laminated multilayer film materials comprising several film plies, at least one (but preferably all) of said plies consisting of films made from the present compositions. Thus, using conventional technology a flexible tubular sheet of the polymer is subjected to helical cutting (spiral cutting) at a cutting angle of about 45°–60° (to the machine direction). As a result of the cutting, film bands with an oblique orientation are obtained. These bands are then superimposed with their directions of orientation crossing and laminated together. The cross-laminated film will exhibit good strength in both machine direction and in transverse direction. Thus, to mention an example, a cross-laminated film material according to the present invention and having a thickness of about 90 to 100 $g/m^2$ exhibits a strain at yield of over 140%, puncture energy ("ball") at 23° C. of more than 14 J, and a dart drop of over 1600 g.

Because the present compositions will provide films with good adhesive properties when they are warm, it is possible to achieve the bonding of the plies of the laminate by heating the helically cut films before they are superimposed and pressed against each other.

Any of the cross-lamination methods discussed in the references cited above can be employed.

The following Examples illustrate the invention.

Description of Analytical Methods

Impact Resistance, Dart-drop (g/50%)

Dart-drop is measured using ISO 7765-1 method. A dart with a 38 mm diameter hemispherical head is dropped from a height of 0,66 m onto a film clamped over a hole. If the specimen fails the weight or the dart is reduced and if it does not fail the weight is increased. At least 20 specimen need to be tested. A weight resulting failure of 50% of the specimen is calculated.

Impact Resistance, Instrumental Falling Weight/IFW (N/mm/J)

The falling weight resistance is measured according to ISO 6603-2. It determines impact behaviour of film under impact of weighted striker applied at right angle at uniform velocity of 2,2 m/s. Height of dropping weighted striker (2 kg) is about 250 cm.

Impact strength (N), deflection at peak force (mm) and break (mm), energy at peak force (J) and energy at break (J) are the final outcome of the results together with force-deflection curve.

Puncture Resistance at Different Temperatures/Perforation Resistance (N/mm/J)

This test method (ASTM D4649(1987)) determines the resistance of a film to the penetration of a probe (spherical, pyramid) at a rate of 500 mm/min at different temperatures (−40° C. to +40° C.). The test specimen is clamped in the holder below the probe.

Puncture resistance (N), energy at break (J) and elongation at break (mm) are the final outcome of the results.

Ultimate Tensile Load (Tensile strenght/MPa)

Tensile strength is obtained from a tensile experiment. The experiment is performed according to ISO 1184 method. The specimen is extended along its major axis at a constant speed.

Ultimate Tensile Stress (Tensile Strength at Yield)

As above, tensile strength.

1% Secant Modulus (MPa)

Secant modulus at 1% elongation is also obtained from a tensile test. The value is the ratio of stress to strain at 1% strain on the stress-strain curve.

EXAMPLES

Example 1

A film according to the invention (92 wt-% of a bimodal LLDPE supplied by Borealis under the designation LE6592, and 8 wt-% of an EMA copolymer supplied by Borealis under the designation OE5625) was blown on a Windmöller & Hölscher line with 90 mm, L=30D extruder, 250 mm die, 1,2 mm die gap and Blow Up Ratio (BUR)=1,6:1.

The film was then spiralcut at a 45° angle. Two films were cross-laminated onto each others according to the Published Patent Application WO 93/14928. The The properties of the film can be seen in the Table 1.

Example 2

Comparative

A comparative film (100% LE6592) was blown and cross-laminated as in Example 1.

Cross-lamination of this film was unsatisfactory because a lot of holes were developing during the cross-lamination process due to stiffness and molecular structure of the polymer.

Example 3

Comparative

A comparative 3-layer film according to Patent WO 93/14928 was blown on unknown line with unknown mm extruder, unknown mm die, unknown mm die gap and BUR<2:1. The film consisted of LLDPE+HDPE+mLLDPE.

Two films were crosslaminated as in Example 1.

The properties of the film can be seen in Table 1.

TABLE 1

|  | Example 1 | Example 2 | Example 3 |
|---|---|---|---|
| Film thickness (g/m$^2$) | 90–100 | 90–100 | 90–100 |
| Stiffness/1% secant modulus (MPa) | 95 | 100 | 210 |
| Stress at yield (N) | 30 | 40 | 27 |
| Strain at yield (%) | 160 | 95 | 20 |
| Puncture energy ("sharp") 23° C. −> −20° C. (J) | 3.0 −> 3.7 | 2.1 −> 2.7 | 1.5 −> 2.4 |
| Puncture energy ("ball") +23° C. −> −20° C. | 14.2 −> 15.6 | 13.7 −> 14.6 | 12.8 −> 17? |
| Dart drop (g/50 %) | >1600 | 1600 | 1200 |
| IFW/falling weight- +23° C. max. force (N) | 140 | 150 | 210 |
| +23° C. max. elongation (mm) | 34 | 23 | 21 |
| +23° C. energy/ max. force and at break (J): | 3.3/3.6 | 3.2/3.9 | 2.1/2.5 |

Table 1 shows that the film according to the invention (Example 1) is much tougher than the film in Example 3 (comparative) which shows the actual solution used today. The toughness can be seen in values of puncture energy, dart drop and IFW/falling weight. Elongation is higher in the film of Example 1 than in the film of Example 3, though while this generally is not desired it may be an advantage in some special applications, e.g., when the film is used as a tarpaulin.

What is claimed is:

1. A cross-laminated film material comprising at least two oriented polymer film plies laminated together, each film being uniaxially oriented in a generally different direction with regard to each other, at least one of said polymer films comprising a polymer composition formed by
    (I) 80–99 wt-% of polyethylene, which comprises components (i) and (ii)
        wherein component (i) has a lower MW and a higher density than component (ii),
        said linear polyethylene having an MFR$_{21}$ of at least 5 g/10 min, a maximum MFR$_2$ of 6 g/10 min, a density of 915–945 kg/m$^3$, and
    (II) 1–20 wt-% of a branched copolymer of ethylene and an acrylate monomer containing 20–28 wt-% acrylate monomer units, said copolymer having an MFR$_2$ of 0.4 to 2.0 g/10 min.

2. The cross-laminated film material according to claim 1, wherein the material comprises 2 to 4 film plies laminated together, the surface weight of the material being about 50 to 300 g/m$^2$.

3. The cross-laminated film material according to claims 1 or 2, wherein the branched copolymer comprises a unit of ethylene and a unit of alkylated methacrylate.

4. The cross-laminated film material according to claim 3, wherein the branched copolymer comprises 23–27% by weight methyl methacrylate units.

5. The cross-laminated film material according to claim 1, wherein the composition contains, calculated from the weight of the composition, 85 to 97% linear bimodal polyethylene and 3 to 15% branched copolymer.

6. The cross-laminated film material according to claim 5, wherein at a thickness of 90 to 100 g/m² the material exhibits a strain at yield of over 140%, puncture energy at 23° C. of more than 14 J, and a dart drop of over 1600 g.

7. The cross-laminated film material according to claim 5, wherein the composition contains, calculated from the weight of the composition, 90 to 95% linear bimodal polyethylene and 5 to 10% branched copolymer.

8. The cross-laminated film material according to claim 1, wherein the polyethylene of component (I) is linear.

9. A method of producing a cross-laminated film material comprising the steps of
providing a polymer composition consisting essentially of
(I) 80–99 wt-% of a polyethylene, which comprises components (i) and (ii), wherein
component (i) has a lower MW and a higher density than component (ii), and
said linear polyethylene having an $MFR_{21}$ of at least 5 g/10 min, a maximum $MFR_2$ of 6 g /10 min, a density of 915–945 kg/m³, and
(II) 1–20 wt-% of a branched copolymer of ethylene and an acrylate monomer containing 20–28 wt-% acrylate monomer units, said copolymer having an $MFR_2$ of 0.4 to 2.0 g/10 min,
processing the polymer composition into a film,
subjecting the film to helical cutting to provide film bands having oblique orientation,
superimposing the film bands so that their directions of orientation are crossing; and
laminating the bands together to form a cross-laminated film structure.

10. The method of claim 9, wherein the film bands are laminated by heating and pressing the bands against each other.

11. The method of claim 10, wherein the film bands are heated before they are superimposed.

12. The method according to claim 9, wherein two to four film bands are laminated together.

13. The method according to claim 9, wherein the branched copolymer comprises a unit of ethylene and a unit of alkylated methacrylate.

14. The method according to claim 9, wherein the branched copolymer comprises 23–27% by weight methyl methacrylate units.

15. The method according to claim 9, wherein the polymer composition contains, calculated from the weight of the composition, 85 to 97% linear bimodal polyethylene and 3 to 15% branched copolymer.

16. The method according to claim 9, wherein at a thickness of 90 to 100 g/m², the material exhibits a strain at yield of over 140%, puncture energy at 23° C. of more than 14 J, and a dart drop of over 1600 g.

17. The method according to claim 9, wherein the polyethylene of component (I) is linear.

* * * * *